(12) United States Patent
Matsuda et al.

(10) Patent No.: US 12,338,884 B2
(45) Date of Patent: Jun. 24, 2025

(54) VEHICLE DRIVE DEVICE

(71) Applicant: AISIN CORPORATION, Aichi (JP)

(72) Inventors: Shintaro Matsuda, Kariya (JP);
Tsubasa Deguchi, Kariya (JP);
Mitsuhiko Kato, Kariya (JP); Kazuya Kawamura, Kariya (JP); Yoshikazu Nakai, Kariya (JP); Nozomi Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/714,362

(22) PCT Filed: Mar. 22, 2023

(86) PCT No.: PCT/JP2023/011121
§ 371 (c)(1),
(2) Date: May 29, 2024

(87) PCT Pub. No.: WO2023/182326
PCT Pub. Date: Sep. 28, 2023

(65) Prior Publication Data
US 2024/0401683 A1 Dec. 5, 2024

(30) Foreign Application Priority Data
Mar. 5, 2022 (JP) ................. 2022-050088

(51) Int. Cl.
*F16H 48/40* (2012.01)
*B60K 1/00* (2006.01)
(Continued)

(52) U.S. Cl.
CPC ........ *F16H 48/40* (2013.01); *B60K 2001/001* (2013.01); *F16H 2048/085* (2013.01);
(Continued)

(58) Field of Classification Search
CPC .... B60K 1/00; B60K 2001/001; H02K 7/006; H02K 7/116; F16H 48/08–11;
(Continued)

(56) References Cited

U.S. PATENT DOCUMENTS 5,533,943 A * 7/1996 Ichioka ............... F16H 1/28
475/221
10,557,525 B2 * 2/2020 Chen ................ F16H 57/02
(Continued)

FOREIGN PATENT DOCUMENTS

CN 106740086 A * 5/2017
JP 2002-104001 A 4/2002
(Continued)

OTHER PUBLICATIONS

Jun. 6, 2023 International Search Report issued in International Patent Application No. PCT/JP2023/011121.

*Primary Examiner* — James J Taylor, II
(74) *Attorney, Agent, or Firm* — Oliff PLC

(57) ABSTRACT

A rotary electric machine, a transmission, and a differential gear device are disposed coaxially. The transmission includes a first helical gear and a second helical gear that meshes with the first helical gear. A case includes a first case member including a stator support portion that supports a stator of the rotary electric machine, a second case member that is structured as a separate member from the first case member and forms a gear chamber that houses the transmission and the differential gear device, and a support member that supports the first helical gear in an axial direction. The support member rotatably supports a rotor of the rotary electric machine via a rotor bearing, and is fixed to the second case member.

4 Claims, 3 Drawing Sheets

(51) Int. Cl.
  *F16H 48/08*  (2006.01)
  *F16H 57/02*  (2012.01)
  *F16H 57/021*  (2012.01)
(52) U.S. Cl.
  CPC .............. *F16H 2057/02034* (2013.01); *F16H 2057/02052* (2013.01); *F16H 2057/0216* (2013.01)
(58) Field of Classification Search
  CPC .. F16H 48/38–2048/426; F16H 57/021; F16H 2057/0216; F16H 2057/02034; F16H 2057/02052
  See application file for complete search history.

(56) References Cited

U.S. PATENT DOCUMENTS

| | | | |
|---|---|---|---|
| 11,027,616 B2 * | 6/2021 | Suyama | ................. B60L 15/20 |
| 2006/0009324 A1 | 1/2006 | Keuth | |

FOREIGN PATENT DOCUMENTS

| | | | | |
|---|---|---|---|---|
| JP | 2018189192 | A | * | 11/2018 |
| JP | 2019-074205 | A | | 5/2019 |
| JP | 2021095952 | A | * | 6/2021 |
| JP | 2022-030222 | A | | 2/2022 |

* cited by examiner

VEHICLE DRIVE DEVICE

TECHNICAL FIELD

The present disclosure relates to a vehicle drive device including a rotary electric machine, a transmission that changes the speed of rotation transmitted from a rotor of the rotary electric machine, a differential gear device that distributes, to a pair of wheels, a driving force from the rotary electric machine transmitted via the transmission, and a case that houses those components.

BACKGROUND ART

An example of such a vehicle drive device is disclosed in Patent Document 1 below. In the following description of the background art, signs used in Patent Document 1 are shown in parentheses.

In a vehicle drive device (100) of Patent Document 1, a case (1) includes a first case member (11) including a stator support portion that supports a stator (24) of a rotary electric machine (2), and a second case member (12) that is structured as a separate member from the first case member and forms a gear chamber that houses a transmission (3) and a differential gear device (4). The first case member (11) and the second case member (12) are joined to each other in an axial direction (L).

RELATED ART DOCUMENTS

Patent Documents

Patent Document 1: Japanese Unexamined Patent Application Publication No. 2019-74205 (JP 2019-74205 A)

SUMMARY OF THE DISCLOSURE

Problem to be Solved by the Disclosure

In the vehicle drive device of Patent Document 1, the transmission includes a first planetary gear mechanism and a second planetary gear mechanism that are single pinion type planetary gear mechanisms. Each gear of the first planetary gear mechanism and the second planetary gear mechanism is a helical gear.

The case further includes a support member that supports a first ring gear of the first planetary gear mechanism and a second ring gear of the second planetary gear mechanism in the axial direction. The support member (14) is fixed to the first case member including the stator support portion.

In the above configuration, a thrust force acting on the first ring gear through meshing with first pinion gears of the first planetary gear mechanism and a thrust force acting on the second ring gear through meshing with second pinion gears of the second planetary gear mechanism are transmitted to the first case portion via the support member. As a result, the stator support portion of the first case portion may be distorted by the thrust forces transmitted via the support member, and furthermore, the stator supported by the stator support portion may be deformed to cause a decrease in the performance of the rotary electric machine.

Therefore, it is desirable to realize a vehicle drive device that can suppress the distortion caused in the stator support portion due to the thrust forces transmitted via the support member that supports the helical gears in the axial direction.

Means for Solving the Problem

As a characteristic configuration of a vehicle drive device in view of the above, the vehicle drive device includes:

a rotary electric machine including a stator and a rotor;
a transmission configured to change a speed of rotation transmitted from the rotor;
a differential gear device configured to distribute, to a pair of wheels provided on a vehicle, a driving force from the rotary electric machine transmitted via the transmission; and
a case that houses the rotary electric machine, the transmission, and the differential gear device, in which
the rotary electric machine, the transmission, and the differential gear device are disposed coaxially,
the transmission includes a first helical gear and a second helical gear that meshes with the first helical gear,
assuming that a direction along a rotation axis of the rotor is an axial direction,
the case includes a first case member including a stator support portion that supports the stator, a second case member that is structured as a separate member from the first case member and forms a gear chamber that houses the transmission and the differential gear device, and a support member that supports the first helical gear in the axial direction, and
the support member rotatably supports the rotor via a rotor bearing, and is fixed to the second case member.

In this characteristic configuration, a thrust force acting on the first helical gear through meshing with the second helical gear is transmitted to the second case member via the support member that supports the first helical gear in the axial direction, and is borne by the support member and the second case member. Since the first case member and the second case member are structured as separate members, the thrust force transmitted to the second case member is unlikely to be transmitted to the first case member. Therefore, it is possible to suppress distortion caused in the stator support portion due to the thrust force transmitted via the support member that supports the first helical gear in the axial direction. As a result, it is possible to avoid a decrease in the performance of the rotary electric machine caused by deformation of the stator supported by the stator support portion.

In this characteristic configuration, the support member not only supports the first helical gear in the axial direction but also rotatably supports the rotor via the rotor bearing. In this way, the first helical gear and the rotor bearing are supported by the single support member. Thus, the vehicle drive device can be downsized compared to a configuration in which the rotor bearing is supported by a separate member from the support member.

MODES FOR CARRYING OUT THE DISCLOSURE

Figure 1:
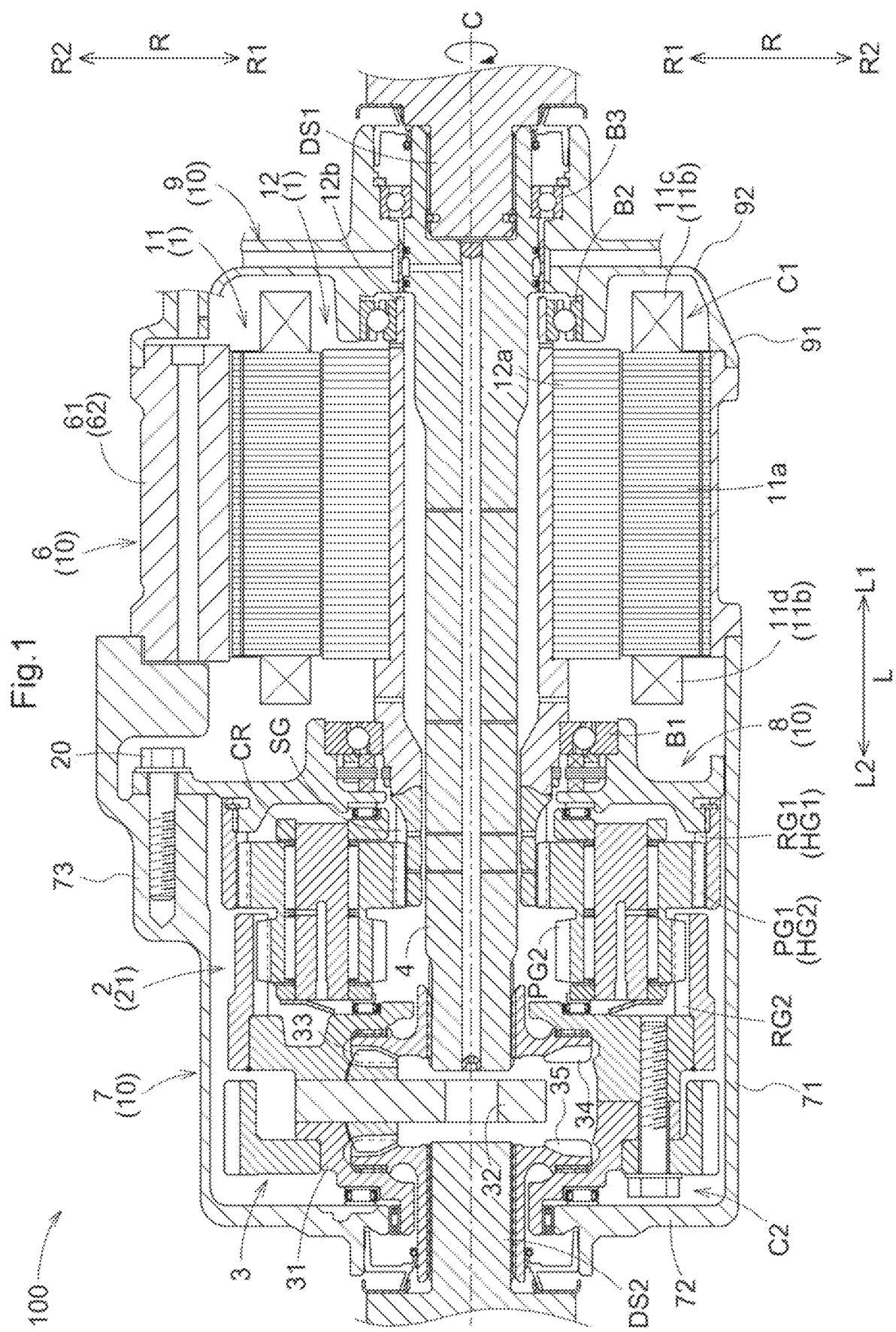
FIG. 1 is a sectional view taken along an axial direction of a vehicle drive device according to an embodiment.
Figure 2:
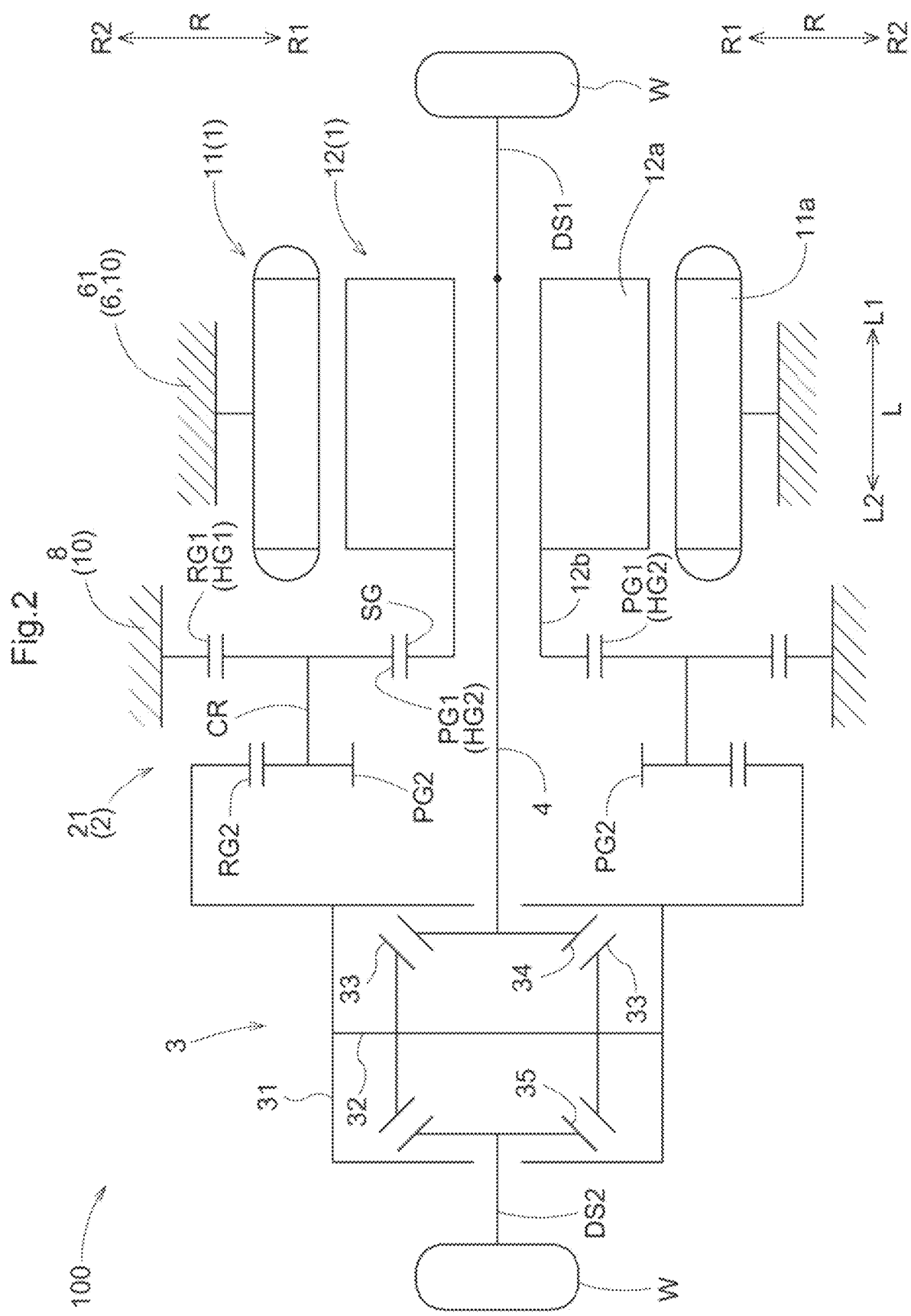
FIG. 2 is a skeleton diagram of the vehicle drive device according to the embodiment.

Hereinafter, a vehicle drive device 100 according to an embodiment will be described with reference to the drawings. As shown in FIGS. 1 and 2, the vehicle drive device 100 includes a rotary electric machine 1 including a stator 11 and a rotor 12, a transmission 2 that changes the speed of rotation transmitted from the rotor 12, a differential gear device 3 that distributes, to a pair of wheels W (see FIG. 2) provided on a vehicle, a driving force from the rotary electric machine 1 transmitted via the transmission 2, and a case 10 that houses those components.

In the following description, a direction along a rotation axis (see long dashed short dashed line in FIG. 1) of the rotor 12 will be referred to as "axial direction L". One side in the axial direction L will be referred to as "first axial side L1" and the other side in the axial direction L will be referred to as "second axial side L2". A direction orthogonal to the rotation axis of the rotor 12 will be referred to as "radial direction R". In the radial direction R, the rotation axis side of the rotor 12 will be referred to as "radially inner side R1", and the opposite side will be referred to as "radially outer side R2". A direction about the rotation axis of the rotor 12 will be referred to as "circumferential direction C".

The rotary electric machine 1, the transmission 2, and the differential gear device 3 are disposed coaxially. In the present embodiment, the rotary electric machine 1, the transmission 2, and the differential gear device 3 are disposed in this order from the first axial side L1 to the second axial side L2.

The rotary electric machine 1 functions as a driving force source for the pair of wheels W (see FIG. 2). The rotary electric machine 1 has a function as a motor (electric motor) that receives supply of electric power to generate driving force, and a function as a generator (electric power generator) that receives supply of driving force to generate electric power. Specifically, the rotary electric machine 1 is electrically connected to a power storage device such as a battery or a capacitor (not shown). The rotary electric machine 1 generates a driving force by power running with electric power stored in the power storage device. The rotary electric machine 1 generates electric power with a driving force transmitted from the pair of wheels W to charge the power storage device.

The stator 11 of the rotary electric machine 1 includes a cylindrical stator core 11a. The stator core 11a is fixed to a case 10. The rotor 12 of the rotary electric machine 1 includes a cylindrical rotor core 12a. The rotor core 12a is supported so as to be rotatable relative to the stator core 11a. In the present embodiment, the rotor 12 further includes a rotor shaft 12b connected to the rotor core 12a so as to rotate integrally with the rotor core 12a. The rotor shaft 12b has a tubular shape coaxial with the rotor core 12a.

In the present embodiment, the rotary electric machine 1 is an inner rotor type rotary electric machine. Therefore, the rotor core 12a is disposed on the radially inner side R1 of the stator core 11a. The rotor shaft 12b is disposed on the radially inner side R1 of the rotor core 12a.

In the present embodiment, the rotary electric machine 1 is a revolving field type rotary electric machine. Therefore, the stator 11 further includes a stator coil 11b. In the present embodiment, the stator coil 11b is wound around the stator core 11a so as to form a first coil end portion 11c protruding from the stator core 11a to the first axial side L1 and a second coil end portion 11d protruding from the stator core 11a to the second axial side L2. Although illustration is omitted, the rotor core 12a is provided with permanent magnets.

Figure 3:
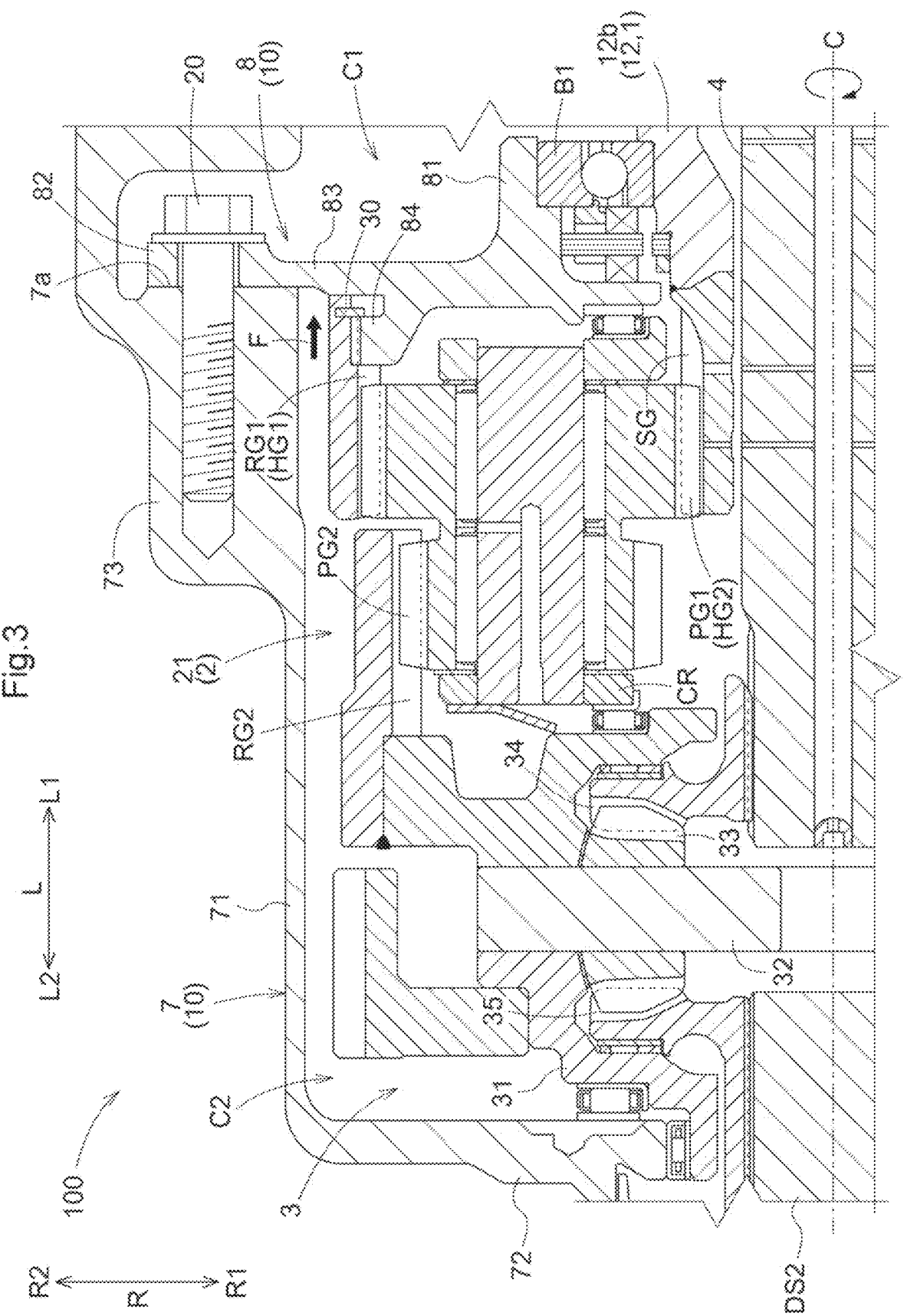
FIG. 3 is a partially enlarged sectional view taken along the axial direction of the vehicle drive device according to the embodiment.

As shown in FIG. 3, the transmission 2 includes a planetary gear mechanism 21 in the present embodiment. In the present embodiment, the planetary gear mechanism 21 includes a sun gear SG, a carrier CR, a first ring gear RG1, and a second ring gear RG2.

The sun gear SG is connected to the rotor 12 so as to rotate integrally with the rotor 12. In the illustrated example, the sun gear SG is connected to the rotor shaft 12b by welding etc. so as to rotate integrally with the rotor shaft 12b.

In the present embodiment, the carrier CR rotatably supports first pinion gears PG1 and second pinion gears PG2. The first pinion gears PG1 and the second pinion gears PG2 are connected so as to rotate integrally with each other. The first pinion gears PG1 mesh with the sun gear SG and the first ring gear RG1. The second pinion gears PG2 mesh with the second ring gear RG2. The second pinion gear PG2 has a smaller diameter than the first pinion gear PG1.

The first ring gear RG1 is fixed to the case 10. The second ring gear RG2 is disposed on the second axial side L2 of the first ring gear RG1. The second ring gear RG2 is connected to an input element of the differential gear device 3 so as to rotate integrally with the input element. Details of how the ring gears RG1, RG2 are connected will be described later.

Each of the sun gear SG, the first pinion gears PG1, second pinion gears PG2, the first ring gear RG1, and the second ring gear RG2 is a helical gear. The helical gear is a gear whose tooth traces are inclined with respect to the rotation axis. The first ring gear RG1 corresponds to a "first helical gear HG1". The first pinion gear PG1 corresponds to a "second helical gear HG2".

In the present embodiment, the speed of rotation of the rotor 12 is reduced by the planetary gear mechanism 21 and the rotation is transmitted to the differential gear device 3. That is, in the present embodiment, the transmission 2 functions as a speed reducer that reduces the speed of rotation transmitted from the rotor 12 at a constant reduction ratio.

In the present embodiment, the differential gear device 3 includes a differential case 31, a shaft member 32, pinion gears 33, a first side gear 34, and a second side gear 35. All of the pinion gears 33, the first side gear 34, and the second side gear 35 are bevel gears.

The differential case 31 is formed so as to house the pinion gears 33, the first side gear 34, and the second side gear 35. The differential case 31 is the input element of the differential gear device 3. Therefore, the differential case 31 is connected to the second ring gear RG2 of the planetary gear mechanism 21 so as to rotate integrally with the second ring gear RG2. In the illustrated example, the differential case 31 is connected to the second ring gear RG2 by welding so as to rotate integrally with the second ring gear RG2.

The shaft member 32 is disposed so as to extend along the radial direction R. The shaft member 32 is supported by the differential case 31 so as to rotate integrally with the differential case 31. In the present embodiment, a plurality of shaft members 32 is disposed in a distributed manner in the circumferential direction C so as to extend along the radial direction R (e.g., four shaft members 32 are disposed in a cross shape in an axial view along the axial direction L).

The pinion gear 33 is rotatably supported by the shaft member 32. The pinion gear 33 is rotatable (spinnable) about the shaft member 32 and rotatable (revolvable) about the rotation axis of the differential case 31. In the present embodiment, the pinion gear 33 is attached to each of the plurality of shaft members 32.

The first side gear 34 and the second side gear 35 mesh with the pinion gears 33. The first side gear 34 and the second side gear 35 are disposed so as to rotate about the rotation axis of the differential case 31. The first side gear 34 is disposed on the first axial side L1 of the shaft member 32. The second side gear 35 is disposed on the second axial side L2 of the shaft member 32.

In the present embodiment, the first side gear 34 is connected to a first drive shaft DS1 drivingly connected to the wheel W on the first axial side L1 via an output shaft member 4 extending along the axial direction L so as to rotate integrally with the first drive shaft DS1. In the illustrated example, the output shaft member 4 is inserted from the first axial side L1 so as to be located on the radially inner side R1 of the first side gear 34, and the output shaft member 4 and the first side gear 34 are connected to each other by spline engagement.

The output shaft member 4 is disposed so as to extend in the axial direction L through the radially inner side R1 of the transmission 2 and the rotary electric machine 1. In the present embodiment, the output shaft member 4 is disposed so as to extend in the axial direction L through the radially inner side R1 of the sun gear SG of the planetary gear mechanism 21 and the rotor shaft 12b of the rotary electric machine 1.

In the present embodiment, the second side gear 35 is connected to a second drive shaft DS2 drivingly connected to the wheel W on the second axial side L2 so as to rotate integrally with the second drive shaft DS2. In the illustrated example, the second drive shaft DS2 is inserted from the second axial side L2 so as to be located on the radially inner side R1 of the second side gear 35, and the second drive shaft DS2 and the second side gear 35 are connected to each other by spline engagement.

As shown in FIG. 1, the case 10 includes a first case member 6, a second case member 7, and a support member 8. In the present embodiment, the case 10 further includes a cover member 9.

The first case member 6 is a member that forms a rotary electric machine chamber C1 that houses the rotary electric machine 1. The first case member 6 includes a stator support portion 61 that supports the stator 11 of the rotary electric machine 1.

In the present embodiment, the first case member 6 further includes a first peripheral wall portion 62. The first peripheral wall portion 62 is formed so as to enclose the rotary electric machine chamber C1 in the circumferential direction C. In the present embodiment, the first peripheral wall portion 62 has a tubular shape covering the radially outer side R2 of the stator core 11a. In the present embodiment, the stator support portion 61 is formed integrally with the first peripheral wall portion 62. The stator core 11a is fixed to the stator support portion 61. In the present embodiment, the first peripheral wall portion 62 does not cover the radially outer side R2 of the first coil end portion 11c and the second coil end portion 11d of the rotary electric machine 1. That is, in the present embodiment, the first case member 6 forms part of the rotary electric machine chamber C1.

The second case member 7 is a member that forms a gear chamber C2 that houses the transmission 2 and the differential gear device 3. The second case member 7 is structured as a separate member from the first case member 6. In the present embodiment, the second case member 7 includes a second peripheral wall portion 71 and a first side wall portion 72.

The second peripheral wall portion 71 is formed so as to enclose the gear chamber C2 in the circumferential direction C. In the present embodiment, the second peripheral wall portion 71 has a tubular shape covering the radially outer side R2 of the transmission 2 and the differential gear device 3. The second peripheral wall portion 71 is formed so as to overlap the entire transmission 2 and the entire differential gear device 3 in a radial view along the radial direction R. That is, in the present embodiment, the entire transmission 2 and the entire differential gear device 3 are housed in the second case member 7. Regarding the disposition of two elements, the phrase "overlap when viewed in a specific direction" means that, when a virtual straight line parallel to the line-of-sight direction is moved in directions orthogonal to the virtual straight line, an area where the virtual straight line intersects both the two elements is present at least in part.

In the present embodiment, the second peripheral wall portion 71 is formed so as to also cover the radially outer side R2 of the second coil end portion 11d of the rotary electric machine 1. That is, in the present embodiment, the second case member 7 forms part of the rotary electric machine chamber C1 in addition to the gear chamber C2.

The first side wall portion 72 is formed so as to cover the second axial side L2 of the gear chamber C2. In the present embodiment, the first side wall portion 72 is formed integrally with the second peripheral wall portion 71 so as to close an opening of the second peripheral wall portion 71 on the second axial side L2. A through hole through which a connecting portion of the second side gear 35 to the second drive shaft DS2 is inserted is formed so as to extend through the first side wall portion 72 in the axial direction L.

The cover member 9 is structured as a separate member from the first case member 6 and the second case member 7. In the present embodiment, the cover member 9 includes a third peripheral wall portion 91 and a second side wall portion 92.

The third peripheral wall portion 91 is formed so as to enclose the rotary electric machine chamber C1. In the present embodiment, the third peripheral wall portion 91 has a tubular shape covering the radially outer side R2 of the first coil end portion 11c of the rotary electric machine 1. That is, in the present embodiment, the cover member 9 forms part of the rotary electric machine chamber C1.

The second side wall portion 92 is formed so as to cover the first axial side L1 of the rotary electric machine chamber C1. In the present embodiment, the second side wall portion 92 is formed integrally with the third peripheral wall portion 91 so as to close an opening of the third peripheral wall portion 91 on the first axial side L1. The second side wall portion 92 rotatably supports, via a second bearing B2, a portion of the rotor shaft 12b that protrudes from the rotor core 12a to the first axial side L1. In the present embodiment, a through hole through which a connecting portion of the output shaft member 4 to the first drive shaft DS1 is inserted is formed so as to extend through the second side wall portion 92 in the axial direction L. The second side wall portion 92 rotatably supports the connecting portion of the output shaft member 4 to the first drive shaft DS1 via a third bearing B3.

In the present embodiment, the first case member 6 is joined to the second case member 7 from the first axial side L1. That is, in the axial direction L, the first axial side L1 is the side where the first case member 6 is disposed with respect to the second case member 7. Thus, in the present embodiment, the first case member 6 and the second case member 7 are joined to each other in the axial direction L. In the illustrated example, the first case member 6 and the second case member 7 are joined such that the first peripheral wall portion 62 and the second peripheral wall portion 71 are in contact with each other in the axial direction L.

In the present embodiment, the cover member 9 is joined to the first case member 6 from the first axial side L1. In the illustrated example, the cover member 9 and the first case member 6 are joined such that the third peripheral wall portion 91 and the first peripheral wall portion 62 are in contact with each other in the axial direction L.

As shown in FIG. 3, the support member 8 supports the first helical gear HG1 in the axial direction L. Further, the support member 8 rotatably supports the rotor 12 via a first bearing BL. The first bearing B1 corresponds to a "rotor bearing". The support member 8 is fixed to the second case member 7. In the present embodiment, the support member 8 is formed so as to separate the rotary electric machine chamber C1 and the gear chamber C2. In the illustrated example, the support member 8 is disposed between the rotary electric machine 1 and the transmission 2 in the axial direction L.

As described above, the vehicle drive device 100 includes:
- the rotary electric machine 1 including the stator 11 and the rotor 12;
- the transmission 2 configured to change the speed of rotation transmitted from the rotor 12;
- the differential gear device 3 configured to distribute, to the pair of wheels W provided on the vehicle, the driving force from the rotary electric machine 1 transmitted via the transmission 2; and
- the case 10 that houses the rotary electric machine 1, the transmission 2, and the differential gear device 3, in which
- the rotary electric machine 1, the transmission 2, and the differential gear device 3 are disposed coaxially,
- the transmission 2 includes the first helical gear HG1 and the second helical gear HG2 that meshes with the first helical gear HG1,
- assuming that the direction along the rotation axis of the rotor 12 is the axial direction L, the case 10 includes the first case member 6 including the stator support portion 61 that supports the stator 11, the second case member 7 that is structured as a separate member from the first case member 6 and forms the gear chamber C2 that houses the transmission 2 and the differential gear device 3, and the support member 8 that supports the first helical gear HG1 in the axial direction L, and
- the support member 8 rotatably supports the rotor 12 via the first bearing B1 serving as the rotor bearing, and is fixed to the second case member 7.

In this configuration, a thrust force F acting on the first helical gear HG1 through meshing with the second helical gear HG2 is transmitted to the second case member 7 via the support member 8 that supports the first helical gear HG1 in the axial direction L, and is borne by the support member 8 and the second case member 7. Since the first case member 6 and the second case member 7 are structured as separate members, the thrust force F transmitted to the second case member 7 is unlikely to be transmitted to the first case member 6. Therefore, it is possible to suppress distortion caused in the stator support portion 61 due to the thrust force F transmitted via the support member 8 that supports the first helical gear HG1 in the axial direction L. As a result, it is possible to avoid a decrease in the performance of the rotary electric machine 1 caused by deformation of the stator 11 supported by the stator support portion 61. In this configuration, the support member 8 not only supports the first helical gear HG1 in the axial direction L but also rotatably supports the rotor 12 via the first bearing B1 serving as the rotor bearing. In this way, the first helical gear HG1 and the first bearing B1 are supported by the single support member 8. Thus, the vehicle drive device 100 can be downsized compared to a configuration in which the first bearing B1 is supported by a separate member from the support member 8.

As described above, in the present embodiment, the first case member 6 and the second case member 7 are joined to each other in the axial direction L, and the entire transmission 2 and the entire differential gear device 3 are housed in the second case member 7.

With this configuration, the rotary electric machine chamber C1 that houses the rotary electric machine 1 can easily be secured widely on the first case member 6 side even in the configuration in which the first case member 6 and the second case member 7 are joined to each other in the axial direction L.

As shown in FIG. 3, the second case member 7 includes a fastened portion 73 to which the support member 8 is fastened with a fastening member 20. The fastened portion 73 is formed so that the fastening member 20 is fixed from the first axial side L1. In the present embodiment, the fastened portion 73 has a joint surface 7a oriented to the first axial side L1. In this example, the fastening member 20 is a bolt. A threaded hole with which the threaded portion of the fastening member 20 engages is formed in the fastened portion 73 so as to be open to the joint surface 7a.

In the present embodiment, the support member 8 includes a bearing support portion 81, a fastening portion 82, a contact portion 83, and an engagement portion 84.

The bearing support portion 81 supports the first bearing B1. In the present embodiment, the bearing support portion 81 is formed such that a portion of the rotor shaft 12b that protrudes from the rotor core 12a to the second axial side L2 extends through the radially inner side R1 of the bearing support portion 81 in the axial direction L. The bearing support portion 81 rotatably supports, via the first bearing B1, the portion of the rotor shaft 12b that protrudes from the rotor core 12a to the second axial side L2.

The fastening portion 82 is fastened to the fastened portion 73 of the second case member 7 with the fastening member 20. In the present embodiment, the fastening portion 82 is fixed by fastening to the fastened portion 73 using the fastening member 20 while being in contact with the joint surface 7a from the first axial side L1. In this example, a plurality of fastening portions 82 is disposed away from each other in the circumferential direction C. In this example, a through hole into which the threaded portion of the fastening member 20 serving as the bolt is inserted is formed so as to extend through the fastening portion 82 in the axial direction L.

The contact portion 83 is structured such that the first helical gear HG1 is in contact therewith in the axial direction L. In the present embodiment, the contact portion 83 is disposed such that the first ring gear RG1 serving as the first helical gear HG1 is in contact with the contact portion 83 from the second axial side L2. In the present embodiment, the contact portion 83 extends in the radial direction R and the circumferential direction C so as to connect the bearing support portion 81 and the fastening portion 82. In this example, the bearing support portion 81 is formed integrally with the end of the contact portion 83 on the radially inner side R1. The fastening portion 82 is formed integrally with the end of the contact portion 83 on the radially outer side R2.

The engagement portion 84 is structured such that the first helical gear HG1 engages therewith. In the present embodiment, the engagement portion 84 is formed such that the first ring gear RG1 serving as the first helical gear HG1 engages with the engagement portion 84 so as to be slidable in the axial direction L and not to be rotatable in the circumferential direction C. In the illustrated example, the engagement portion 84 protrudes from the contact portion 83 to the second axial side L2 and further to the radially outer side R2 so as to be positioned on the radially inner side R1 of the first ring gear RG1.

In the present embodiment, the first ring gear RG1 is in contact with the contact portion 83 from the second axial side L2, thereby restricting relative movement to the first axial side L1 with respect to the engagement portion 84. In the present embodiment, a restriction member 30 such as a snap ring is provided on the inner peripheral portion of the first ring gear RG1 so that the engagement portion 84 comes into contact with the restriction member 30 from the second axial side L2. Therefore, relative movement of the first ring gear RG1 to the second axial side L2 with respect to the engagement portion 84 is restricted by the restriction member 30. As described above, in the present embodiment, the first ring gear RG1 serving as the first helical gear HG1 engages with the support member 8 so as not to be rotatable relatively. That is, in the present embodiment, the support member 8 supports the first helical gear HG1 in the axial direction L and the circumferential direction C.

Thus, in the present embodiment, the second case member 7 has the joint surface 7a oriented to the first axial side L1, and the support member 8 is fixed by fastening to the second case member 7 using the fastening member 20 while being in contact with the joint surface 7a from the first axial side L1, and supports the first helical gear HG1 in the axial direction L and the circumferential direction C.

With this configuration, the thrust force F from the first helical gear HG1 can appropriately be borne by the support member 8. Since the thrust force F acting on the support member 8 acts in the axial direction L with respect to the joint surface 7a of the second case member 7, distortion of the second case member 7 can be reduced easily. Therefore, distortion of the first case member 6 can also be reduced easily.

In the present embodiment, when the rotary electric machine 1 is driven so that the vehicle including the vehicle drive device 100 moves forward, the thrust force F acting on the first helical gear HG1 through meshing with the second helical gear HG2 acts to the first axial side L1. In this example, the thrust force F from the first helical gear HG1 to the first axial side L1 is received by the contact portion 83 of the support member 8.

With this configuration, the thrust force F from the first helical gear HG1 to the first axial side L1 can appropriately be borne by the support member 8 while the vehicle is moving forward.

In the present embodiment, the transmission 2 includes the planetary gear mechanism 21 including the carrier CR and the first ring gear RG1,
 the carrier CR rotatably supports the first pinion gear PG1 meshing with the first ring gear RG1,
 the second helical gear HG2 is the first pinion gear PG1, and
 the first helical gear HG1 is the first ring gear RG1 and engages with the support member 8 so as not to be rotatable relatively.

In such a configuration, the thrust force F acting on the first helical gear HG1 through meshing with the second helical gear HG2 is easily transmitted to the support member 8, and furthermore, to the second case member 7. Therefore, such a configuration is suitable when applied to the above configuration in which the first case member 6 and the second case member 7 are structured as separate members and the support member 8 is fixed to the second case member 7.

In the present embodiment, in the above configuration in which the transmission 2 includes the planetary gear mechanism 21 including the carrier CR and the first ring gear RG1,
 the planetary gear mechanism 21 further includes the sun gear SG and the second ring gear RG2,
 the sun gear SG is connected to the rotor 12 so as to rotate integrally with the rotor 12, the second ring gear RG2 is disposed on the second axial side L2 of the first ring gear RG1,
 the carrier CR rotatably supports the second pinion gear PG2 in addition to the first pinion gear PG1,
 the first pinion gear PG1 and the second pinion gear PG2 are connected so as to rotate integrally with each other,
 the first pinion gear PG1 meshes with the sun gear SG and the first ring gear RG1, and
 the second pinion gear PG2 has a smaller diameter than the first pinion gear PG1 and meshes with the second ring gear RG2.

With this configuration, the transmission 2 can be structured as a speed reducer having a high reduction ratio.

Other Embodiments (1) The above embodiment exemplifies the configuration in which the transmission 2 includes the planetary gear mechanism 21 including the sun gear SG, the carrier CR, the first ring gear RG1, and the second ring gear RG2 and the first ring gear RG1 and the first pinion gear PG1 are the first helical gear HG1 and the second helical gear HG2, respectively. However, the present disclosure is not limited to such a configuration. For example, the planetary gear mechanism 21 may be a single pinion type planetary gear mechanism, and the ring gear of the planetary gear mechanism and the pinion gear meshing with the ring gear may be the first helical gear HG1 and the second helical gear HG2, respectively.

(2) The above embodiment exemplifies the configuration in which the transmission 2 functions as the speed reducer that reduces the speed of rotation transmitted from the rotor 12 at the constant reduction ratio. However, the present disclosure is not limited to such a configuration. For example, the transmission 2 may be a transmission that can switch a plurality of shift speeds.

(3) The above embodiment exemplifies the configuration in which the first helical gear HG1 engages with the support member 8 so as not to be rotatable relatively. However, the present disclosure is not limited to such a configuration, and the first helical gear HG1 may be supported so as to be rotatable relative to the support member 8. In this case, a thrust bearing may be disposed between the first helical gear HG1 and the support member 8 in the axial direction L.

(4) The above embodiment exemplifies the configuration in which the first case member 6 and the second case member 7 are joined to each other in the axial direction L. However, the present disclosure is not limited to such a configuration. For example, another case member may be interposed between the first case member 6 and the second case member 7 in the axial direction L.

(5) The above embodiment exemplifies the configuration in which the support member 8 is fixed by fastening to the second case member 7 using the bolt that is the fastening member 20. However, the present disclosure is not limited to such a configuration. For example, the support member 8 may be fixed to the second case member 7 by welding or riveting.

(6) The above embodiment exemplifies the configuration in which the case 10 includes the cover member 9 in addition to the first case member 6, the second case member 7, and the support member 8. However, the present disclosure is not limited to such a configuration. For example, the case 10 need not include the cover member 9. In this case, for example, the first case member 6 includes a wall portion corresponding to the cover member 9 (specifically, the third peripheral wall portion 91 and the second side wall portion 92). The case 10 may include another member in addition to the first case member 6, the second case member 7, the support member 8, and the cover member 9.

(7) The configuration disclosed in each of the above embodiments can be applied in combination with any of the configurations disclosed in the other embodiments as long as no contradiction arises. Regarding the other configurations, the embodiments disclosed herein are merely illustrative in all respects. Therefore, various modifications can be made as appropriate without departing from the spirit of the present disclosure.

Summary of Embodiment Described Above

Hereinafter, a summary of the vehicle drive device (100) described above will be provided.

A vehicle drive device (100) includes:
a rotary electric machine (1) including a stator (11) and a rotor (12);
a transmission (2) configured to change a speed of rotation transmitted from the rotor (12);
a differential gear device (3) configured to distribute, to a pair of wheels (W) provided on
a vehicle, a driving force from the rotary electric machine (1) transmitted via the transmission (2); and
a case (10) that houses the rotary electric machine (1), the transmission (2), and the differential gear device (3), in which
the rotary electric machine (1), the transmission (2), and the differential gear device (3) are disposed coaxially, the transmission (2) includes a first helical gear (HG1) and a second helical gear (HG2) that meshes with the first helical gear (HG1),
assuming that a direction along a rotation axis of the rotor (12) is an axial direction (L), the case (10) includes a first case member (6) including a stator support portion (61) that supports the stator (11), a second case member (7) that is structured as a separate member from the first case member (6) and forms a gear chamber (C2) that houses the transmission (2) and the differential gear device (3), and a support member (8) that supports the first helical gear (HG1) in the axial direction (L), and
the support member (8) rotatably supports the rotor (12) via a rotor bearing (B1), and is fixed to the second case member (7).

In this configuration, a thrust force (F) acting on the first helical gear (HG1) through meshing with the second helical gear (HG2) is transmitted to the second case member (7) via the support member (8) that supports the first helical gear (HG1) in the axial direction (L), and is borne by the support member (8) and the second case member (7). Since the first case member (6) and the second case member (7) are structured as separate members, the thrust force (F) transmitted to the second case member (7) is unlikely to be transmitted to the first case member (6). Therefore, it is possible to suppress distortion caused in the stator support portion (61) due to the thrust force (F) transmitted via the support member (8) that supports the first helical gear (HG1) in the axial direction (L). As a result, it is possible to avoid a decrease in the performance of the rotary electric machine (1) caused by deformation of the stator (11) supported by the stator support portion (61).

In this configuration, the support member (8) not only supports the first helical gear (HG1) in the axial direction (L) but also rotatably supports the rotor (12) via the rotor bearing (B1). In this way, the first helical gear (HG1) and the rotor bearing (B1) are supported by the single support member (8). Thus, the vehicle drive device (100) can be downsized compared to a configuration in which the rotor bearing (B1) is supported by a separate member from the support member (8).

It is preferable that, assuming that a side where the first case member (6) is disposed with respect to the second case member (7) in the axial direction (L) is a first axial side (L1), when the rotary electric machine (1) is driven so that the vehicle moves forward, the thrust force (F) acting on the first helical gear (HG1) through meshing with the second helical gear (HG2) act to the first axial side (L1).

With this configuration, the thrust force (F) from the first helical gear (HG1) to the first axial side (L1) can appropriately be borne by the support member (8) while the vehicle is moving forward.

It is preferable that the first case member (6) and the second case member (7) be joined to each other in the axial direction (L), and the entire transmission (2) and the entire differential gear device (3) be housed in the second case member (7).

With this configuration, a rotary electric machine chamber (C1) that houses the rotary electric machine (1) can easily be secured widely on the first case member (6) side even in the configuration in which the first case member (6) and the second case member (7) are joined to each other in the axial direction (L).

It is preferable that, assuming that a direction about the rotation axis of the rotor (12) is a circumferential direction (C), a side where the first case member (6) is disposed with respect to the second case member (7) in the axial direction (L) is a first axial side (L1), and a side opposite to the first axial side (L1) is a second axial side (L2),
the second case member (7) have a joint surface (7a) oriented to the first axial side (L1), and
the support member (8) be fixed by fastening to the second case member (7) using a fastening member (20) while being in contact with the joint surface (7a) from the first axial side (L1), and support the first helical gear (HG1) in the axial direction (L) and the circumferential direction (C).

With this configuration, the thrust force (F) from the first helical gear (HG1) can appropriately be borne by the support member (8). Since the thrust force (F) acting on the support member (8) acts in the axial direction (L) with respect to the joint surface (7a) of the second case member (7), distortion of the second case member (7) can be reduced easily. Therefore, distortion of the first case member (6) can also be reduced easily.

INDUSTRIAL APPLICABILITY

The technology disclosed herein is applicable to a vehicle drive device including a rotary electric machine, a transmission that changes the speed of rotation transmitted from a rotor of the rotary electric machine, a differential gear device that distributes, to a pair of wheels, a driving force from the rotary electric machine transmitted via the transmission, and a case that houses those components.

DESCRIPTION OF THE REFERENCE NUMERALS

100: vehicle drive device, 1: rotary electric machine, 11: stator, 12: rotor, 2: transmission, HG1: first helical gear, HG2: second helical gear, 3: differential gear device, 6: first case member, 61: stator support portion, 7: second case member, 8: support member, 10: case, C2: gear chamber, W: wheel, L: axial direction

The invention claimed is:

1. A vehicle drive device comprising:
a rotary electric machine including a stator and a rotor;
a transmission configured to change a speed of rotation transmitted from the rotor;
a differential gear device configured to distribute, to a pair of wheels provided on a vehicle, a driving force from the rotary electric machine transmitted via the transmission; and
a case that houses the rotary electric machine, the transmission, and the differential gear device, wherein
the rotary electric machine, the transmission, and the differential gear device are disposed coaxially,
the transmission includes:
a first pinion gear,
a second pinion gear,
a sun gear that is connected to the rotor so as to rotate integrally with the rotor,
a first ring gear, the first pinion gear meshing with the sun gear and the first ring gear,
a second ring gear, the second pinion gear having a smaller diameter than the first pinion gear and meshing with the second ring gear, and
a carrier that rotatably supports the first pinion gear and the second pinion gear that is connected to the first pinion gear so as to rotate integrally with the first pinion gear,
a direction along a rotation axis of the rotor is an axial direction,
the case includes a first case member that is a stator support portion that supports the stator, a second case member that is structured as a separate member from the first case member and forms a gear chamber that houses the transmission and the differential gear device, and a support member that supports the first ring gear in the axial direction and is engaged with the first ring gear so as not to be rotatable relative to the first ring gear,
a side where the first case member is disposed with respect to the second case member in the axial direction is a first axial side, and a side opposite to the first axial side is a second axial side,
the second ring gear is disposed on the second axial side of the first ring gear, and
the support member rotatably supports the rotor via a rotor bearing, and is fixed to the second case member.

2. The vehicle drive device according to claim 1, wherein when the rotary electric machine is driven so that the vehicle moves forward, a thrust force acting on the first ring gear through meshing with the first pinion gear acts to the first axial side.

3. The vehicle drive device according to claim 1, wherein the first case member and the second case member are joined to each other in the axial direction, and the transmission and the differential gear device are housed in the second case member.

4. The vehicle drive device according to claim 1, wherein a direction about the rotation axis of the rotor is a circumferential direction,
the second case member has a joint surface oriented to the first axial side, and
the support member is fixed by fastening to the second case member using a fastening member while being in contact with the joint surface from the first axial side, and supports the first ring gear in the axial direction and the circumferential direction.

* * * * *